(12) United States Patent
Pierrat (10) Patent No.: US 11,296,606 B2
(45) Date of Patent: Apr. 5, 2022

(54) HIGH POWER TRANSFORMER AND TRANSMITTER FOR GEOPHYSICAL MEASUREMENTS

(71) Applicant: IRIS INSTRUMENTS, Orléans (FR)

(72) Inventor: Ghislain Pierrat, Orléans (FR)

(73) Assignee: IRIS INSTRUMENTS, Orléans (FR)

( * ) Notice: Subject to any disclaimer, the term of this patent is extended or adjusted under 35 U.S.C. 154(b) by 48 days.

(21) Appl. No.: 16/417,947

(22) Filed: May 21, 2019

(65) Prior Publication Data
US 2019/0363634 A1 Nov. 28, 2019

(30) Foreign Application Priority Data

May 22, 2018 (EP) ..................................... 18305626

(51) Int. Cl.
| | | |
|---|---|---|
| *H02M 3/335* | (2006.01) | |
| *H01F 27/28* | (2006.01) | |
| *H01F 27/24* | (2006.01) | |
| *G01V 3/02* | (2006.01) | |

(52) U.S. Cl.
CPC .......... *H02M 3/33523* (2013.01); *G01V 3/02* (2013.01); *H01F 27/24* (2013.01); *H01F 27/2823* (2013.01)

(58) Field of Classification Search
CPC ....... H02M 3/33523; H02M 2001/008; H02M 2001/348; H02M 3/33507; G01V 3/02; G01V 3/10; H01F 27/24; H01F 27/2823; Y02B 70/10
See application file for complete search history.

(56) References Cited

U.S. PATENT DOCUMENTS

| | | | | |
|---|---|---|---|---|
| 2008/0068119 | A1* | 3/2008 | Avila Montes | ......... H01F 29/14 336/155 |
| 2013/0100715 | A1* | 4/2013 | Lin | ......... H02M 1/44 363/21.17 |
| 2013/0234717 | A1 | 9/2013 | Wang | |
| 2013/0285786 | A1* | 10/2013 | Hu | ......... H01F 38/30 336/220 |
| 2015/0326132 | A1* | 11/2015 | Herbert | ......... H01F 38/00 363/21.04 |

(Continued)

OTHER PUBLICATIONS

R. Prieto et al., "Selection of the appropriate winding setup in planar inductors with parallel windings", Energy Conversion Congress and Exposition (ECCE), 2010 IEEE, Sep. 10, 2010, pp. 4599-4604.

(Continued)

*Primary Examiner* — Alvaro E Fortich
*Assistant Examiner* — Zannatul Ferdous
(74) *Attorney, Agent, or Firm* — Maier & Maier, PLLC (57) ABSTRACT

An output high power transformer, including a primary and a secondary in galvanic isolation forming a flyback converter, wherein the primary includes at least one primary winding having at least two primary turns and a rectifier including a junction diode circuit; the secondary includes at least one secondary winding having at least one secondary turn; and the flyback converter includes at the primary at least one metal-oxide-semiconductor field-effect transistor (MOSFET), notably a Silicon Carbide MOSFET, and at the secondary at least one Silicon Carbide diode.

13 Claims, 10 Drawing Sheets

(56) References Cited

U.S. PATENT DOCUMENTS

| | | | |
|---|---|---|---|
| 2016/0056703 A1 | 2/2016 | Deboy et al. | |
| 2016/0116925 A1* | 4/2016 | Freeman | H02M 3/33515 |
| | | | 307/130 |
| 2016/0178788 A1* | 6/2016 | Zhang | G01N 27/06 |
| | | | 324/324 |
| 2016/0225514 A1* | 8/2016 | Cheng | H01F 27/2866 |
| 2017/0250023 A1* | 8/2017 | Valdivia-Guerrero | |
| | | | B64D 47/00 |
| 2018/0013352 A1* | 1/2018 | Cao | H02M 3/33515 |
| 2018/0034378 A1 | 2/2018 | Lin et al. | |
| 2018/0097446 A1* | 4/2018 | Wang | H02M 1/36 |
| 2019/0180921 A1* | 6/2019 | Korherr | H01F 27/24 |
| 2019/0280586 A1* | 9/2019 | Chen | H02J 3/18 |
| 2020/0112241 A1* | 4/2020 | Wang | H02M 3/33569 |
| 2021/0099091 A1* | 4/2021 | Sato | H02M 3/33515 |

OTHER PUBLICATIONS

Search Report dated Nov. 29, 2018 in corresponding European Application No. 18 30 5626; 4 pages.

* cited by examiner

HIGH POWER TRANSFORMER AND TRANSMITTER FOR GEOPHYSICAL MEASUREMENTS

FIELD

The present invention pertains to the field of geophysical instruments. In particular, the invention relates to an output high power transformer and to a transmitter comprising said transformer and being configured to inject a current in a soil through multiple injection electrodes.

BACKGROUND

In the field of geophysics, multiple methods are known for mineral exploration. Among those, induced polarization is a geophysical imaging technique used to identify the electrical chargeability of subsurface materials. In standard induced polarization survey, an electric current is transmitted into a subsurface through two electrodes and the difference of potential generated by the current is measured by two other electrodes. A set-up for induced polarization survey therefore comprises a transmitter to generate a current to be injected in the soil and a receiver. The depth of investigation depends on the distance between the injection electrodes and receiving electrodes but also on the intensity of the current injected into the soil. Therefore, in order to improve the depth of investigation of this geophysical method, the power generated by the electrical transmitter has to be improved. Furthermore, such a set-up has to be designed to be easily transported on the measurement sites, which are usually of difficult access. Consequently, there is a need to develop a more powerful electrical transmitter having a compact and light design.

SUMMARY

The present invention relates to an output high power transformer, comprising a primary and a secondary in galvanic isolation forming a flyback converter, wherein:
- the primary comprises at least one primary winding having at least two primary turns and a primary rectifier comprising a junction diode circuit;
- the secondary comprises at least one secondary winding having at least one secondary turn; and
- the flyback converter comprises at the primary at least one metal-oxide-semiconductor field-effect transistor (MOSFET), notably a Silicon Carbide MOSFET, and at the secondary at least one Silicon Carbide diode.

The implementation of a flyback converter has multiple advantages such as the ability to regulate the multiple output voltages with a single control, the ability to operate in a wide range of input voltages and the necessity of very few components compared to other types of switched-mode power supply. Wide bandgap semiconductors, such as silicon carbide (SiC), provide larger bandgaps, higher breakdown electric field, and higher thermal conductivity. Power semiconductor devices made with SiC are capable of higher blocking voltages, higher switching frequencies, and higher junction temperatures than silicon devices offering multiple advantages to power circuit designers.

According to one embodiment, the primary rectifier circuit is a single-phase or a multi-phase rectifier circuit. According to one embodiment, the primary rectifier circuit is a junction diodes circuit, such as a Graetz bridge rectifier, a full-wave rectifier, a diode-bridge rectifier and the like.

According to one embodiment, each secondary winding is connected to a secondary rectifier.

According to one embodiment, the transformer further comprises a core configured to receive the primary winding and the secondary winding. According to one embodiment, the core is made of material of high magnetic permeability and high saturation point such as ferrites, solid metals, powered metals and the like. The high permeability, relative to the surrounding air, causes the magnetic field lines to be concentrated in the core material. In the case of a flyback transformer, as in the present invention, the magnetic field is created by a current-carrying coil of wire (i.e. primary winding and secondary winding) wound around the core.

According to one embodiment, the core is a closed-core. The closed-core may be a so-called "core type", when primary and secondary windings surround the core, or a so-called "shell type", when primary and secondary windings are surrounded by the core. In both types of transformer core design, the magnetic flux linking the primary and secondary windings travels entirely within the core with minimal loss of magnetic flux through air.

The shell-form transformer (i.e. transformers comprising a shell-type transformer core) is a mechanically strong design for a transformer, with the coils arranged vertically and completely surrounded on all sides by the core.

According to a preferred embodiment, the transformer comprises a shell-type transformer core having an elongated central limb, configured to receive the primary winding and the secondary winding, and two outer limbs, wherein at least one of the two outer limbs comprises at least two discrete air-gaps defining at least two non-ferromagnetic volumes oriented transversally to a longitudinal axis of the central limb. The main advantages of using a shell-type transformer core are high short-circuit withstand capability, high mechanical strength, high dielectric strength and an excellent control of the leakage magnetic flux to prevent against local heating inside the transformer, indeed the coil windings are almost completely surrounded by the core, which absorbs most of the leakage flux from the windings.

According to one embodiment, each of the two outer limbs comprises at least one discrete air-gaps defining at least two non-ferromagnetic volumes oriented transversally to a longitudinal axis of the central limb. In one example, each outer limb comprises an equal number of airgaps, said number being superior to one. When multiple air-gaps are defined in the outer limbs, they may be disposed symmetrically. According to one embodiment the central limb cross section is circular. Advantageously, the use of several air gaps contributes to reduce the magnetic field leakage path length, reducing temperature raise in the transformer and electromagnetic interferences which could disturb electronic components of the system.

According to one embodiment, the non-ferromagnetic volumes of the air-gaps are made of electrical isolating materials immune to electromagnetic saturation such as nylon, plexiglass, epoxy and the like.

According to one embodiment, the transformer further comprises a printed circuit board (PCB) and a PCB connector for electrical and mechanical connection of the primary winding and the secondary winding to the printed circuit board. In this embodiment, the transformer comprises a coil former equipped with pins for electrical and mechanical connection of the primary winding and the secondary winding to the printed circuit board.

According to one embodiment, the transformer further comprises an isolation system at the connector between the primary winding and the secondary winding. The isolation system has the advantage to protect against electric shock for user safety reasons.

According to one embodiment, the primary winding and the secondary winding are magnetically coupled by being wound around the central limb in an interleave configuration. According to this embodiment, a first half of the at least two primary turns of the primary winding is wound around the central limb and is concentrically overlapped with the secondary turns of the secondary winding, and the secondary turns of the secondary winding is concentrically overlapped with the second half of the at least two primary turns of the primary winding. Such interleaved windings have the advantage of involving a low eddy loss and low inductance.

According to one embodiment, the number of turns at the primary winding ranges between 8 and 24 and the number of turns at the secondary winding ranges between 4 and 12.

The difference in voltage between the primary and the secondary windings is achieved by changing the number of coil turns in the primary winding compared to the number of coil turns on the secondary winding. The ratio between the number of turns of the primary coil and the number of turns of the secondary coil is called the ratio of transformation, or more commonly known as a transformer "turns ratio". Said turns ratio value, also equal to the ratio between the voltage at the primary and the voltage at the secondary, dictates the operation of the transformer and the corresponding voltage available on the secondary winding. According to one embodiment, the turns ratio of the transformer is inferior to 1.

According to one embodiment, the secondary comprises at least four secondary windings. According to one embodiment, the at least 4 secondary windings are electrically isolated from each other's. A transformer with multiple secondaries produces multiple output voltages.

According to one embodiment, the primary winding and the secondary winding are made of Litz wire. A Litz wire is composed of multiple strands, wherein each strand is individually insulated, and the strands are arranged so that at certain points in the winding, or throughout the whole winding, each portion occupies different relative positions in the complete conductor. The transposition equalizes the current flowing in each strand of the conductor and reduces eddy current losses in the winding itself. The stranded conductor is also more flexible than a solid conductor of similar size, aiding manufacture. The use of Litz wire also allows to minimize the skin-effect and proximity effect losses.

According to an alternative embodiment, the primary winding and the secondary winding are made of a copper foil. The copper foil has a thickness that may range between 0.05 and 0.5 mm, notably a thickness of 0.1 mm allows to limit the bulkiness of the windings. This solution has the advantage of further reducing the skin effect and therefore reduce temperature raise in the core. A foil-wound coil advantageously allows to make optimum use of the available winding area. Each turn of the foil extends edge-to-edge of the coil and is separated from the next turn by one thickness of insulation. There is no lost winding space which means that foil with the same circular mil area as wire will fit into a smaller winding area, or conversely, more circular mils of foil may be wound into the same winding area. The use of the foil-wound coil has the further advantage of reducing the problem of dissipating the generated heat. Indeed, each turn extending the full width of the coil has two edges in contact with the surrounding air and each turn may dissipate the heat directly to the outer surface of the coil.

The present invention further relates to a power module comprising at least two electrically coupled transformers according to any one of the embodiments described hereabove.

The present invention further relates to an assembly comprising at least two power modules according to any one of the embodiments described hereabove.

According to one embodiment, the at least two power modules are electrically independent. This characteristic has the advantage that, in case of break-up of one of the two power modules, the other will continue to work independently.

The present invention further relates to a transmitter comprising at least one modulator and at least one power module according to any one of the embodiments described hereabove.

Yet another aspect of the present invention is a system for injecting a current, wherein the system comprises at least on transmitter according to any one of the embodiments described hereabove. According to one embodiment, said transmitter is connected to at least two injection electrodes configured to be inserted in a soil or is connected to a loop-antenna.

According to one embodiment, the system is configured to be powered by an engine-generator working in a tension coupling mode. In one embodiment, the engine-generator is a single-phase or a three-phase engine-generator.

Another subject-matter of the invention is a kit of parts for geophysical measurements of a transfer function between an injected current in a soil or in a loop-antenna and a soil electromagnetic field induced by said injected current, wherein the kit of parts comprises:
 a transmitter according to any one of the embodiments described hereabove, which is connected to at least two injection electrodes configured to be inserted in the soil or in the loop antenna; and
 a receiver, which is configured to measure the soil electromagnetic field induced by the injected current.

DEFINITIONS

In the present invention, the following terms have the following meanings:
 "Creepage distance": refers to the shortest path between two conductive parts (or between a conductive part and the bounding surface of an equipment) measured along a surface of insulating material.
 "Buck-boost converter": refers to a type of DC-to-DC converter that has an output voltage magnitude that is either greater than or less than the input voltage magnitude.
 "Transformer": refers to a static electrical device that transfers electrical energy between two or more circuits through electromagnetic induction.

BRIEF DESCRIPTION OF THE DRAWINGS

Features and advantages of the invention will become apparent from the following description of embodiments of an output high power transformer, a power module, a transmitter according to the invention, this description being given merely by way of example and with reference to the appended drawings in which.

DETAILED DESCRIPTION

Figure 1:
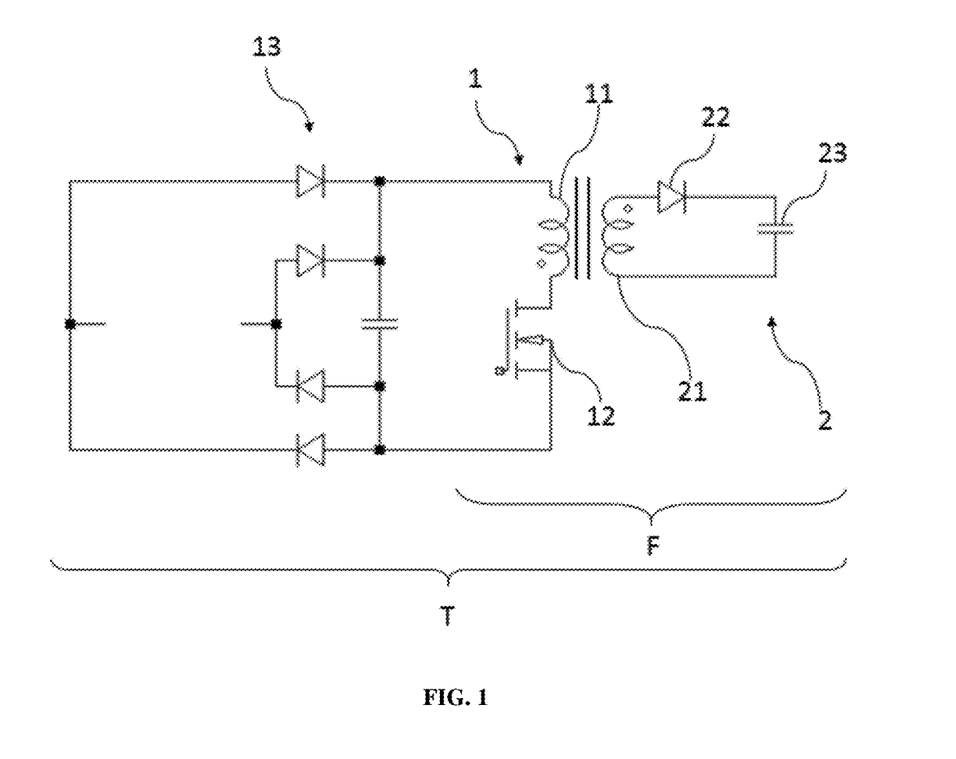
FIG. 1 is a circuit diagram of an output high power transformer according to a first embodiment of the invention.

As shown in FIG. 1, the output high power transformer T according to the first embodiment comprises a primary 1 with one primary winding 11 and a secondary 2 with one secondary winding 21 in galvanic isolation in order to form a flyback converter F.

In a known manner, a flyback converter is a buck-boost converter where the inductor is split to form a transformer, so that the voltage ratios are multiplied with an additional advantage of isolation. In the flyback configuration, a primary and a secondary winding are utilized as two separate inductors. The primary winding stores energy when connected to the voltage source, the secondary winding transfers this energy to an output capacitor as soon as the primary is disconnected from the voltage source.

The flyback converter F comprises at the primary 1 a transistor 12, which is a Silicon Carbide transistor. Silicon carbide (SiC), also known as carborundum, is a compound including silicon and carbon which provides advantages for fast, high-temperature and/or high-voltage transformers. The silicon carbide transistor, can be any suitable form of field effect transistor, such as an enhancement mode or depletion mode MOSFET. In an advantageous example, the transistor 12 is a silicon carbide metal-oxide-semiconductor field-effect transistor (SICFET). Advantageously, the introduction of a SICFET allows to use much higher frequencies while reducing the heating of the transformer and the global weight. Indeed, SICFET has extremely short reverse recovery time which allows to reduce the heating of the transistor. The reduced heating further allows to implement a smaller cooling system. SICFET suitable for the use in the present invention are commercially available and are notably commercialized by WOLFSPEED. Notably, a SICFET that may be used is the C2M0080120 manufactured by CREE, other such as INFINEON, USCI, ROHM, STM or IXYS.

The primary 1 further comprises a diode-bridge as primary rectifier 13 wherein the diodes are silicon diodes. At the secondary, the secondary winding 21 is connected to a secondary rectifier comprising a diode 22 and a capacitor 23. The diode 22 in the secondary rectifies the voltage while the capacitor 23 smoothies the rectified voltage. The diode 22 at the secondary 2 may be a Silicon Carbide diode. Said Silicon Carbide diode has extremely short reverse recovery time which reduces the energy dissipated during the blocking time and therefore the heat generated by the diode. For further heat reduction the diode 22 may be advantageously replaced by a synchronous rectifier using SICFET like technology.

Figure 2:
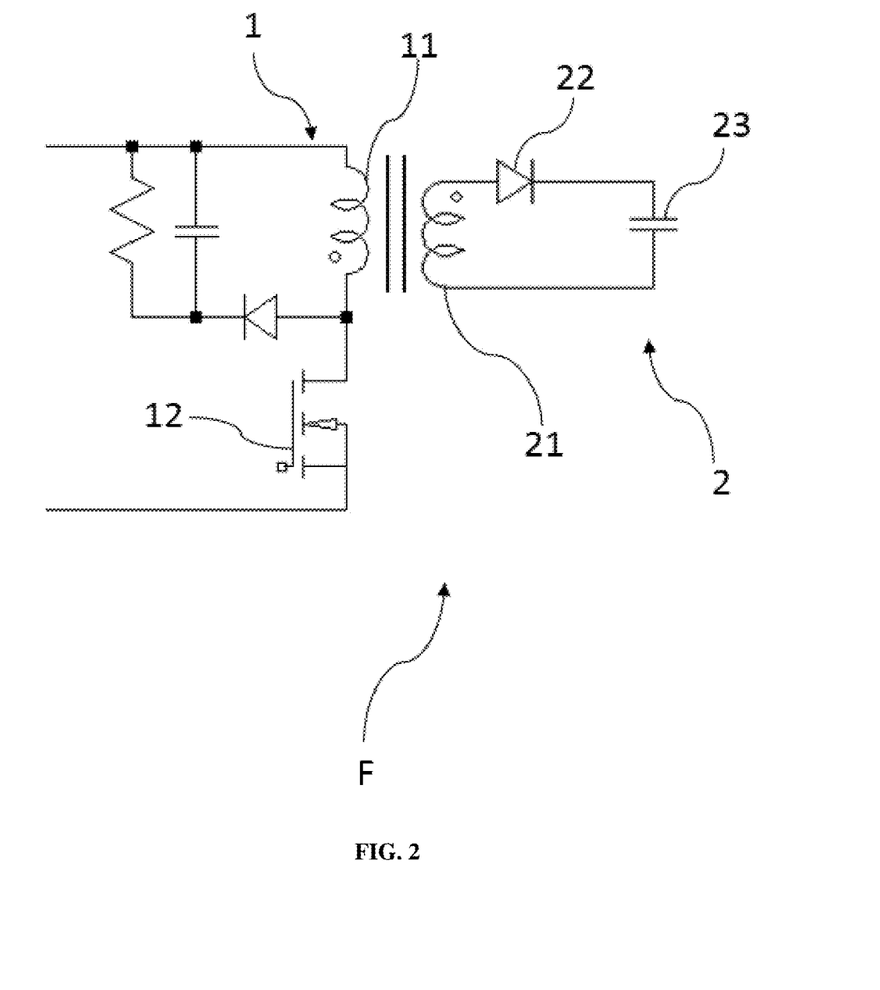
FIG. 2 is a zoomed version of FIG. 1 showing a possible variant for the flyback converter of the output high power transformer.

FIG. 2 shows a possible variant for the flyback converter F of the output high power transformer T. In this variant, the primary 1 further comprises a snubber circuit to suppress overvoltage due to sudden interruption of current flow. The snubber provides a short-term alternative current path around the current switching device so that the inductive element may be discharged more safely and quietly. The snubber circuit may be a RC snubber consisting of a resistor in series with a capacitor, a diode snubber consisting of a diode wired in parallel with the inductive load, or a RCD snubber which uses a diode with a RC network, which is the case shown in FIG. 2.

Figure 3:
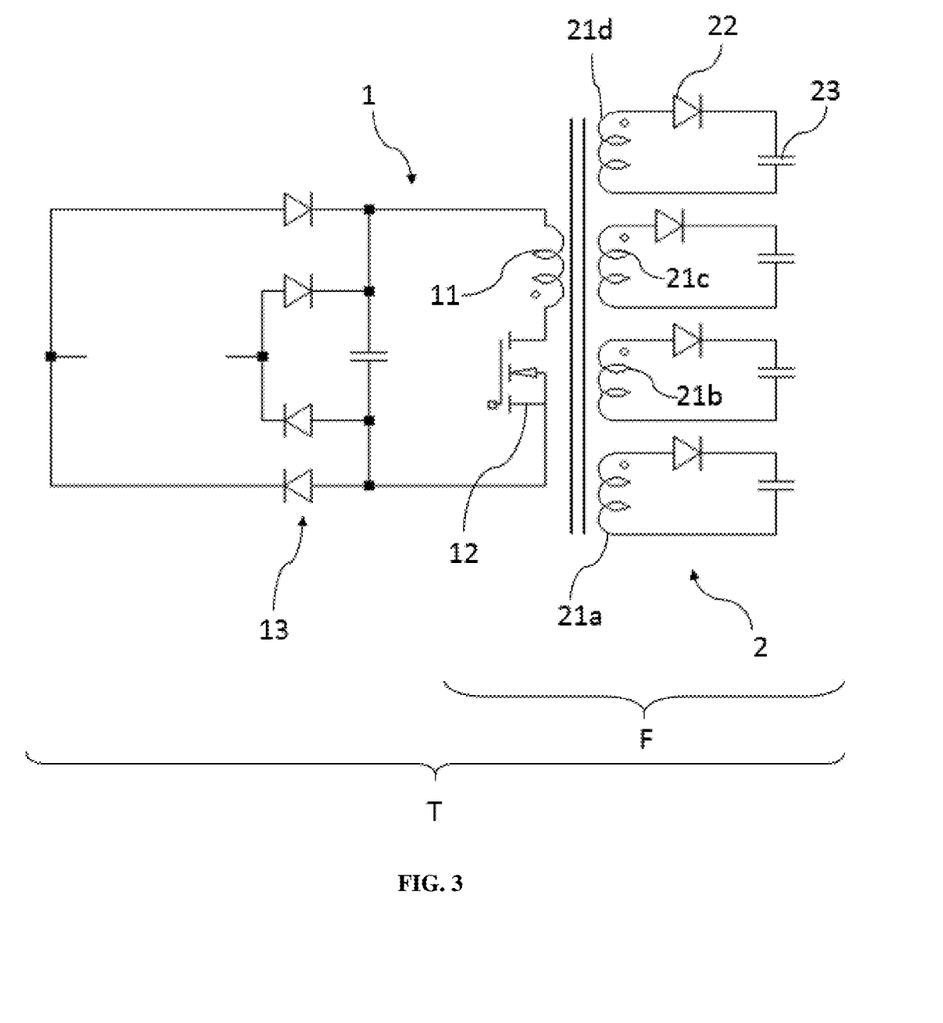
FIG. 3 is a circuit diagram of an output high power transformer according to a second embodiment of the invention, wherein the secondary comprises four secondary winding.

In the second embodiment shown in FIG. 3, the output high power transformer T differs from the output high power transformer of the first embodiment in that the secondary 2 comprises four secondary windings 21a, 21b, 21c, 21d, instead of one secondary winding 21, each of the secondary windings 21a, 21b, 21c, 21d being connected to a secondary rectifier comprising a diode 22 and a capacitor 23.

The output high power transformer T of FIG. 1 comprises a shell-type transformer core C configured to receive the primary winding 11 and the secondary winding 21.

Figure 4A:
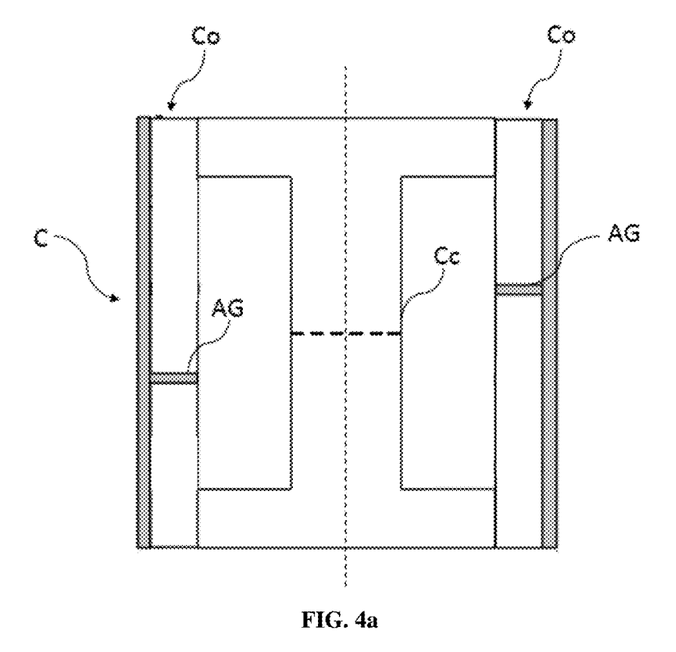
FIG. 4a is schematic cross sections of a shell-type transformer core of the output high power transformer of FIG. 1 or FIG. 3.
Figure 4B:
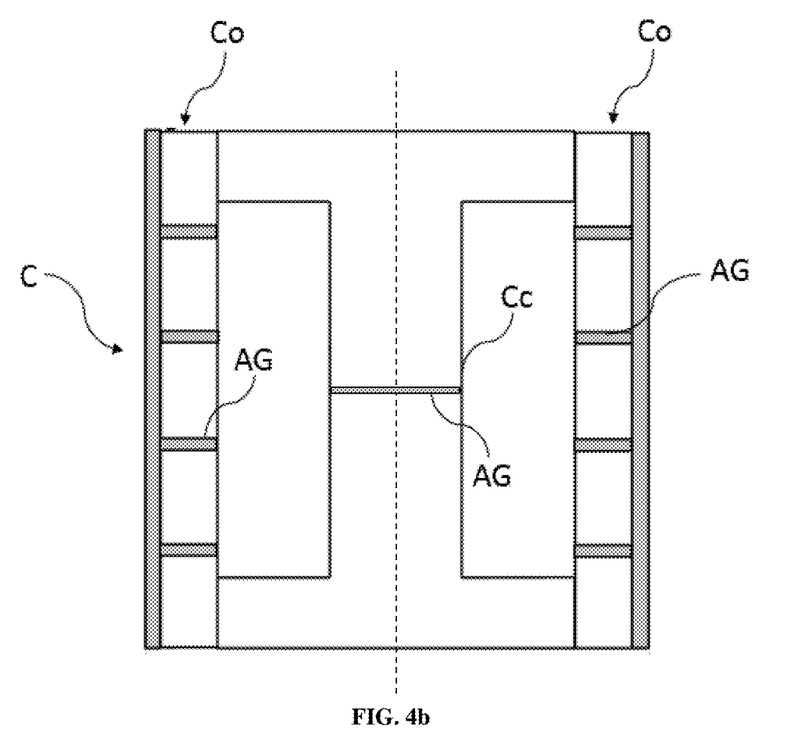
FIG. 4b is schematic cross sections of a shell-type transformer core of the output high power transformer of FIG. 1 or FIG. 3.

As shown in FIG. 4, the shell-type transformer core C comprises a central limb Cc, configured to receive the primary winding 11 and the secondary winding 21, and two outer limbs Co. Such a shell type transformer core makes it possible to overcome the problem of leakage of magnetic flux, both the primary and secondary windings being wound on the same central limb which has twice the cross-sectional area of the two outer limbs. The advantage here is that the magnetic flux has two closed magnetic paths to flow around on the exterior to the windings, on both left and right-hand sides, before returning back to the windings. As the magnetic flux has a closed path around the windings, this has the advantage of decreasing core losses and increasing overall efficiency. Transformers comprising a shell type transformer core, also called shell form transformers, exhibit inherently better kVA-to-weight ratio, better short-circuit strength characteristics and higher immunity to transit damage.

According to one embodiment which has not been represented in the figures, the central limb Cc may comprise at least one air-gap defining at least one non-ferromagnetic volume oriented transversally to a longitudinal axis of the central limb Cc. The introduction of air-gaps in a flyback converter helps increase saturation current and diminishes inhomogeneity of inductance value in the core C and its dependence to the permeability value of the ferrite. The air-gap volumes are cumulative, therefore, a predefined air-gap volume which has been chosen so as to optimize the leakage inductance may be introduced in the core as a unique volume or multiple segmented volumes distributed in the central limb Cc and/or in the two outer limbs Co.

In the embodiment shown in FIG. 4a, the central limb Cc has a continuous volume of ferromagnetic material without airgaps and each one of the two outer limbs Co comprises at least one discrete air-gap AG, so as to define at least two non-ferromagnetic volumes oriented transversally to a longitudinal axis of the central limb Cc. This distribution of the air-gaps has the advantage of significantly reducing the temperature in the central region of the core.

Figure 5:
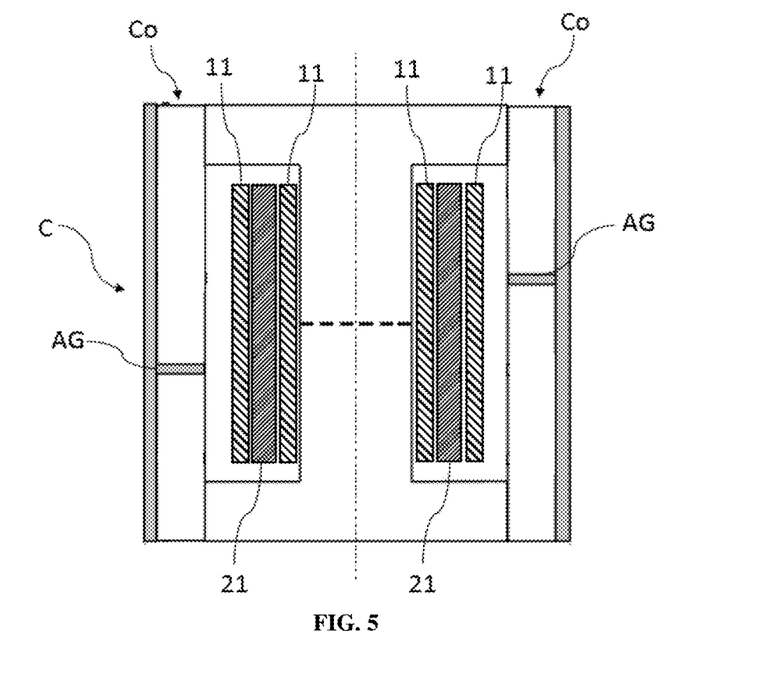
FIG. 5 is a schematic cross section similar to FIG. 4, showing additionally an interleave configuration of the primary and secondary windings of the output high power transformer of FIG. 1 around the shell-type transformer core.

In the embodiment illustrated in FIG. 4b, the central limb Cc comprises an air-gap approximately at half height and each one of the two outer limbs Co comprises multiple discrete air-gap AG symmetrically disposed along the outer limbs As shown in FIG. 5, which corresponds to the structure of the output high power transformer T according to the first embodiment, the primary winding 11 and the secondary winding 21 are magnetically coupled by being wound around the central limb Cc of the shell-type transformer core C in an interleave configuration. Said interleave configuration is made such that a first half of the primary turns of the primary windings 11 is wound around the central limb Cc and is concentrically overlapped with the secondary turns of the secondary winding 21, and the secondary turns of the secondary winding 21 are concentrically overlapped with the second half of the at least two primary turns of the primary windings 11.

According to one feature, which has not been represented in the figures, a first electrically insulating layer may be present between the first half of the primary turns of the primary winding and the secondary turns of the secondary winding. In addition, a second electrically insulating layer may be present between the second half of the primary turns of the primary winding and the secondary turns of the secondary winding.

Said interleave configuration allows an optimal magnetic coupling so as to reduce leakage inductance to about 1% and thus lower losses. Indeed, the leakage inductance depends from the positioning of the windings around the core C and the isolation between the primary winding 11 and the secondary winding 21.

In the case of the embodiment of FIG. 2, wherein the secondary 2 comprises four secondary windings, the primary winding 11 and the four secondary windings 21a, 21b, 21c, 21d are advantageously magnetically coupled by being wound around the central limb Cc in a second interleave configuration (not represented in the figures), such that a first half of the primary turns of the primary winding 11 is wound around the central limb Cc in a first primary coil; a first second winding 21a is wound around a first portion of the first primary coil and a second secondary winding 21b is wound around a second portion of the first primary coil; a third secondary winding 21c is wound around the central limb Cc so to overlap with the turns of the first secondary winding 21a; and the fourth secondary winding 21d is wound around the central limb Cc so to overlap to the turns of the second secondary winding 21b.

According to one feature, which has not been represented in the figures, a first electrically insulating layer may be present between the first half of the primary turns of the primary winding 11 and the secondary turns of the first secondary winding 21a and the second secondary winding 21b. In addition, a second electrically insulating layer may be present between the second half of the primary turns of the primary winding 11 and the secondary turns of the third secondary winding 21c and fourth secondary winding 21d, and a third electrically insulating layer may be present between the secondary turns of the first and second secondary windings 21a, 21b and the secondary turns of the third and fourth secondary windings 21c, 21d.

In the first and second embodiments, the output high power transformer T comprises a global isolation system. The global isolation system, which is implemented to guarantee the safety of the user and the quality of the measurements, consists of multiple isolation parts. The global isolation system may implement notably an isolation of the internal power supplies from one another, the isolation of the communication, command and control lines. The isolation of the output high power transformer is obtained, on the one hand, thanks to the different insulators positioned during the winding, thus creating creepage distances of defined length, as well as vacuum impregnation of the transformer and, on the other hand, thanks to the physical separation of the primary and secondary connections, each of which uses a row of distant pins, thus creating a large escape distance.

The isolation of communication lines may be achieved by the use of optocouplers. The isolation of measurement lines may also be realized using components including an optical principle. The isolation of the controls may be done by means of at least one transformer.

The output high power transformer T comprises an isolation system at the connector between the primary winding 11 and the secondary winding 21. Said isolation system may comprise tape margin at the edges of the coils of the primary winding 11 and the secondary winding 21 to provide the required creepage for the safety requirements (i.e. for Information Technology Equipment, which is covered by UL1950 in the US, and EN60950(IEC950) in Europe). A creepage distance of 5-6 mm is usually sufficient, therefore a margin tape ranging between 2 mm and 4 mm is generally used on the primary 1 and secondary 2. According to one non-represented embodiment, the margins are constructed from tape which is cut to a predefined width for the margin which is usually ½ the required creepage distance. The margin tape may be then layered to match the height of the windings. The core size selected should allow for the available winding width to be at least twice the creepage distance required to maintain good coupling and minimize the leakage inductance. The implementation of margins, has the advantage of introducing an effective creepage distance and full voltage isolation between the primary 1 and secondary 2.

If the primary winding 11 is arranged in more than one layer, one layer of basic insulation (which is cut to fit between the margins) may be placed between the primary winding layers to reduce the possibility of breakdown between layers and also reduce the interwinding capacitance of the primary 1. Polyester and Mylar may be used for the insulation layers and the margins.

The turn's ratio influences the peak primary and secondary currents as well as the duty cycle and the peak voltage, thus defining the breakdown parameters of the semiconductors.

Figure 6:
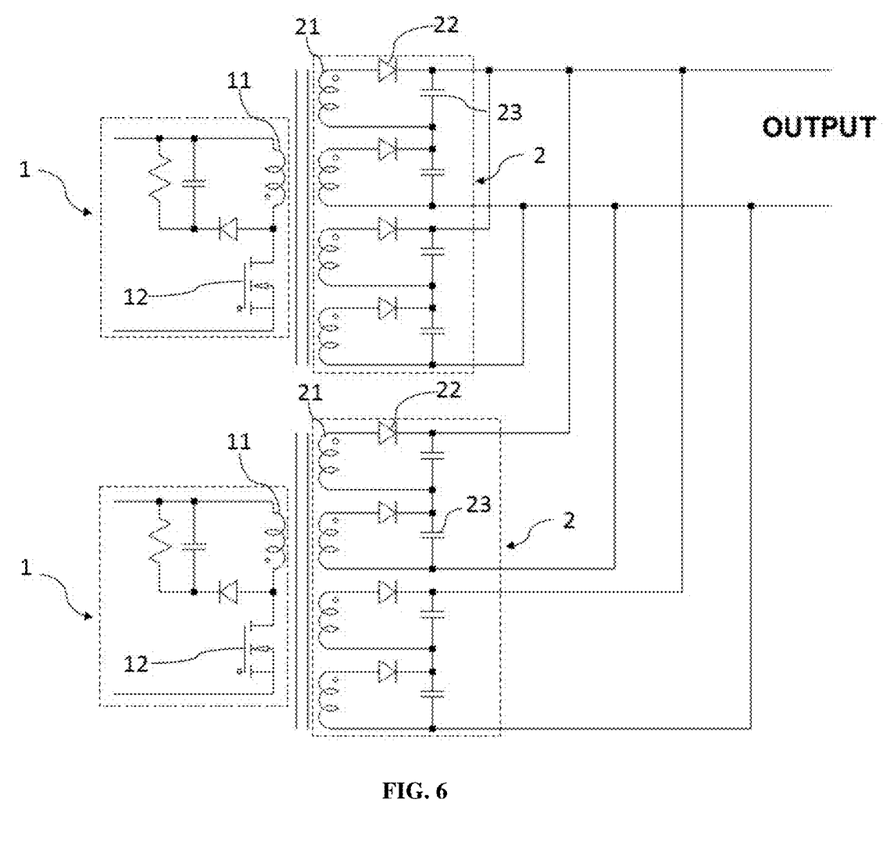
FIG. 6 is a circuit diagram of a power module comprising, connected in parallel, two output high power transformers according to the second embodiment shown in FIG. 3.
Figure 7:
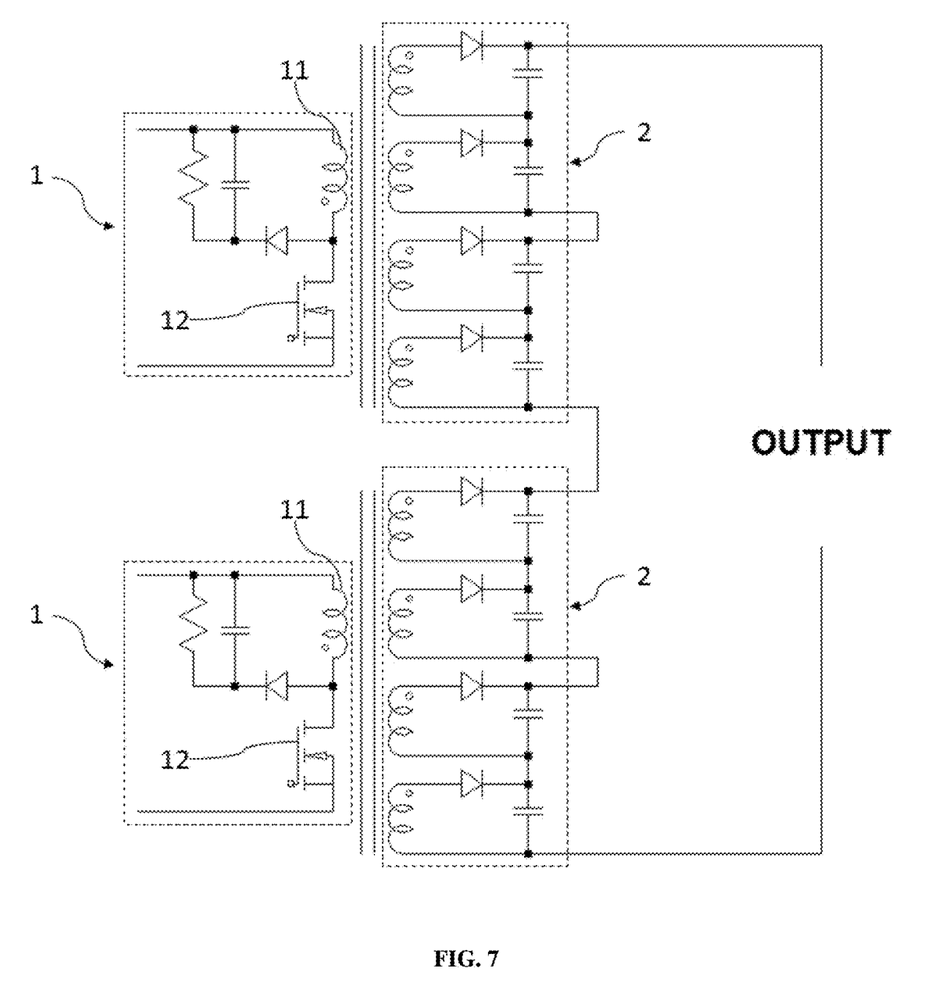
FIG. 7 is a circuit diagram of a power module comprising, connected in series, two output high power transformers according to the second embodiment shown in FIG. 3.

FIGS. 6 and 7 each show a power module comprising two electrically coupled transformers T according to the second embodiment shown in FIG. 3. In FIG. 6, the two output high power transformers T are connected in parallel. In FIG. 7, the two output high power transformers T are connected in series. The combination of at least two transformers in a power module makes it possible to rise the output power generated.

Figure 8:
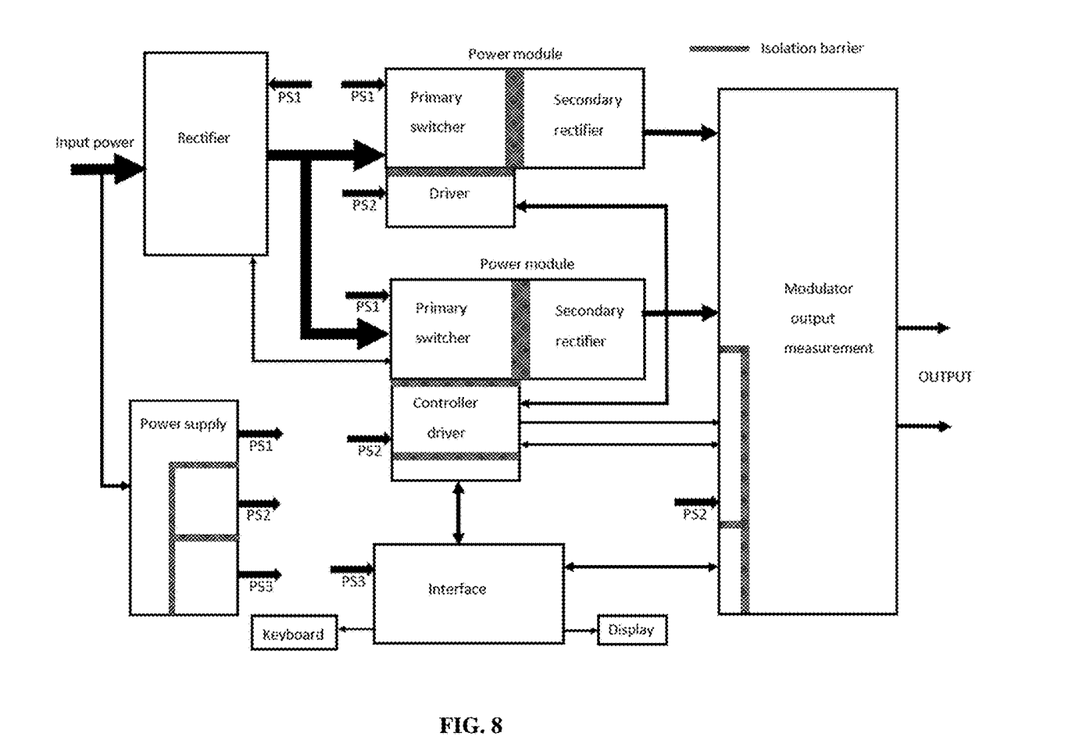
FIG. 8 is a synoptic table of a first example of a transmitter, comprising two power modules as shown in FIG. 6 or FIG. 7.
Figure 9:
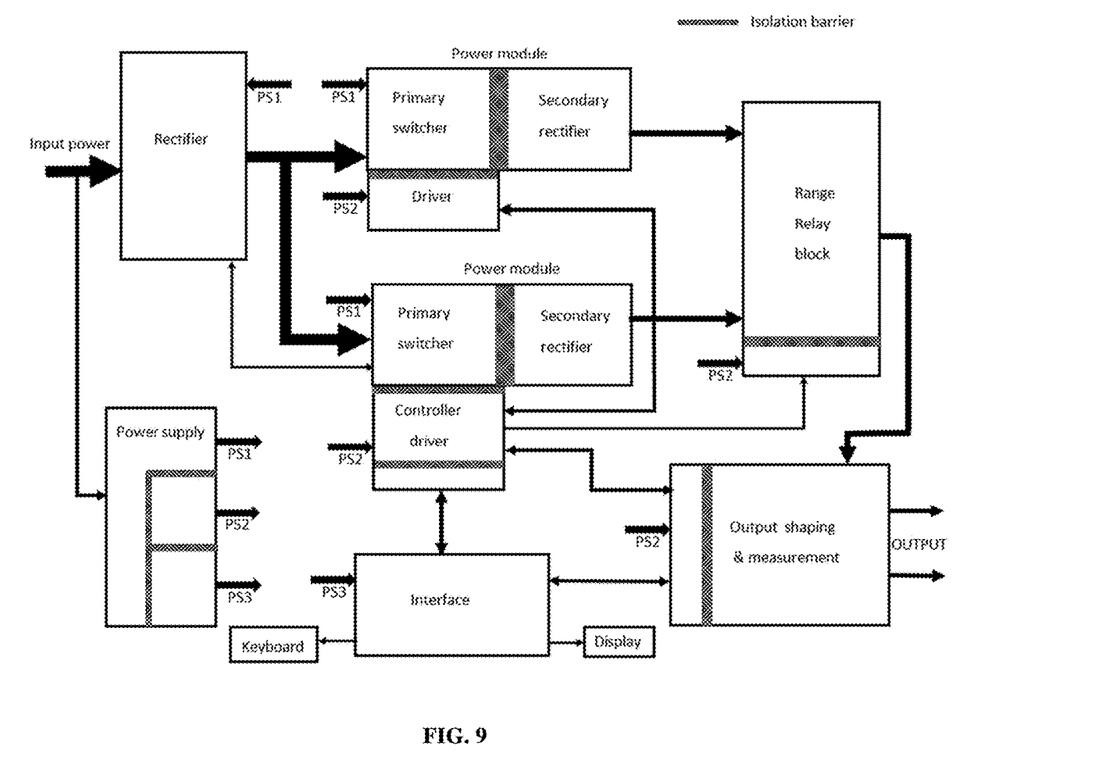
FIG. 9 is a synoptic table of a second example of a transmitter, comprising two power modules as shown in FIG. 6 or FIG. 7 and further comprising a range relay block.

FIGS. 8 and 9 each show a transmitter E, comprising an output modulator and an assembly of at least two power modules as shown in FIG. 6 or FIG. 7.

In FIG. 9, the transmitter E comprises a range relay block allowing the selection of the range desired for the output current. The transmitter E comprises as well an output shaping block configured to modulate the current intensity at the output of the transmitter E allowing to obtain a large range of frequencies between 0.01 Hz and 10 kHz. The transmitter E further comprises an interface block for the control and command of the transmitter by the user comprising for example a keyboard and a display.

The transmitter E of the present invention is suitable for any electromagnetic method such as SIP (Spectral Induced Polarization), CSEM (Controlled Source Electromagnetism), CSAMT (Controlled source Audio-Magnetotelluric) or TDEM (Time Domain Electro Magnetism), and the like.

Figure 10:
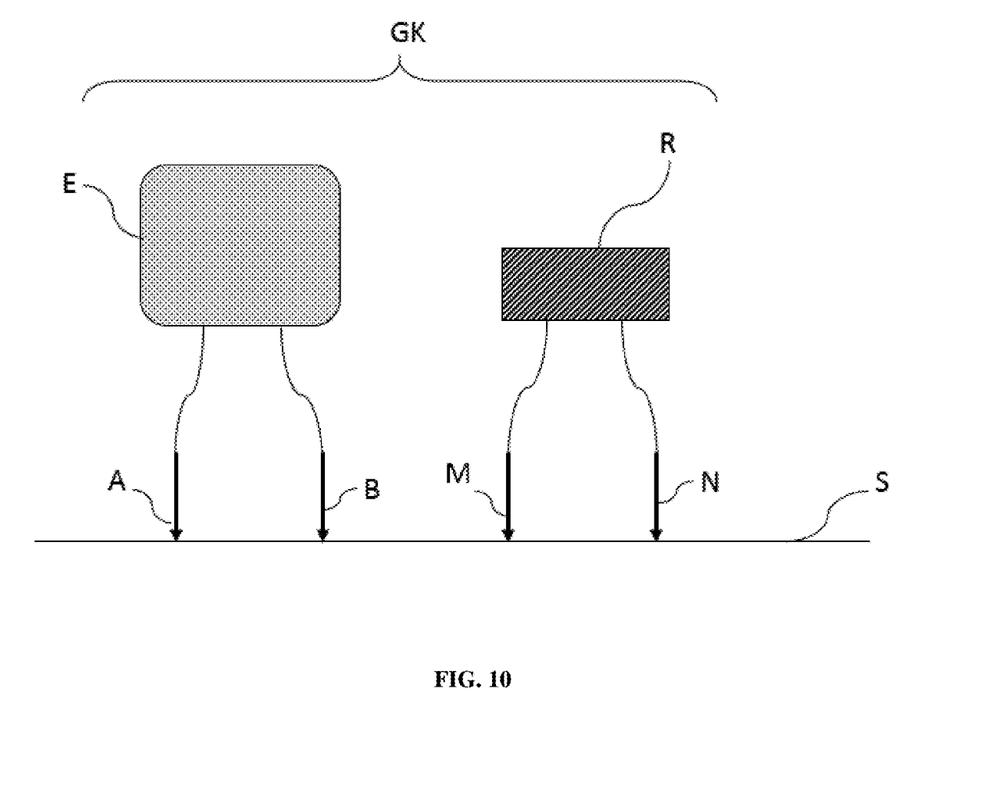
FIG. 10 is a schematic representation of a kit of parts for geophysical measurements, comprising a transmitter as shown in FIG. 8 or FIG. 9 according to an embodiment of the present invention.

FIG. 10 shows a system configured to inject a current I in a soil, comprising a transmitter E as described above. In this example, the transmitter E is connected to two injection electrodes, A and B, configured to be inserted in the soil S.

More generally, FIG. 10 shows a kit of parts GK for geophysical measurements of a transfer function between an injected current I in a soil S and a soil electromagnetic field induced by said injected current I. In FIG. 10, the kit of parts GK comprises the transmitter E, which is connected to the two injection electrodes A, B configured to be inserted in the soil S. The kit of parts GK further comprises a receiver R, which is configured to measure the electromagnetic field induced by the injected current I. The receiver R is connected to two receiving electrodes M, N configured to be inserted in the soil S in order to measure the difference of potential between the at least two receiving electrodes M, N. As a variant, the receiver R may be connected to a loop antenna.

While various embodiments have been described and illustrated, the detailed description is not to be construed as being limited hereto. Various modifications can be made to the embodiments described above by those skilled in the art without departing from the true spirit and scope of the disclosure as defined by the claims.

The invention claimed is:

1. An output high power transformer, comprising a primary and a secondary in galvanic isolation forming a flyback converter, said flyback converter comprising:
   at the primary at least one primary winding having at least two primary turns and a primary rectifier comprising a junction diode circuit and at least one metal-oxide-semiconductor field-effect transistor (MOSFET), notably a Silicon Carbide MOSFET;
   at the secondary at least one secondary winding having at least one secondary turn and at least one Silicon Carbide diode;
   wherein the primary winding and the secondary winding are magnetically coupled by being wound around the central limb in an interleave configuration; in said interleave configuration being such that a first half of the at least two primary turns of the primary windings are wound around the central limb and are concentrically overlapped with the secondary turns of the secondary winding, and the secondary turns of the secondary winding is concentrically overlapped with the second half of the at least two primary turns of the primary windings.

2. The transformer according to claim 1, further comprising a shell-type transformer core having an elongated central limb, configured to receive the primary winding and the secondary winding, and two outer limbs, wherein each of the two outer limbs comprises at least one discrete air-gap, each air-gap defining a non-ferromagnetic volume oriented transversally to a longitudinal axis of the central limb.

3. The transformer according to claim 1, comprising a printed circuit board (PCB) and a PCB connector for electrical and mechanical connection of the primary winding and the secondary winding to the printed circuit board.

4. The transformer according to claim 3, comprising an isolation system at the connector between the primary winding and the secondary winding.

5. The transformer according to claim 1, wherein the secondary comprises at least four secondary winding.

6. The transformer according to claim 1, wherein the primary winding and the secondary winding are made of Litz wire.

7. The transformer according to claim 1, wherein the primary winding and the secondary winding are made of a copper foil.

8. A power module comprising at least two electrically coupled transformers, each transformer comprising a primary and a secondary in galvanic isolation forming a flyback converter, wherein:
   at the primary comprises at least one primary winding having at least two primary turns and a primary rectifier comprising a junction diode circuit and at least one metal-oxide-semiconductor field-effect transistor (MOSFET), notably a Silicon Carbide MOSFET;
   the secondary comprises at least one secondary winding having at least one secondary turn and at least one Silicon Carbide diode;
   wherein the primary winding and the secondary winding are magnetically coupled by being wound around the central limb in an interleave configuration; in said interleave configuration being such that a first half of the at least two primary turns of the primary windings are wound around the central limb and are concentrically overlapped with the secondary turns of the secondary winding, and the secondary turns of the secondary winding is concentrically overlapped with the second half of the at least two primary turns of the primary windings.

9. An assembly comprising at least two power modules according to claim 8, wherein the at least two power modules are electrically independent.

10. A transmitter comprising at least one modulator and at least one power module according to claim 8.

11. A system for injecting a current, wherein the system comprises at least on transmitter according to claim 10 connected to at least two injection electrodes configured to be inserted in the soil or connected to a loop-antenna.

12. The system according to claim 11, being configured to be powered by an engine-generator working in a tension coupling mode, wherein the engine-generator is a single-phase or a three-phase engine-generator.

13. A kit of parts for geophysical measurements of a transfer function between an injected current in a soil or in a loop-antenna and a soil electromagnetic field induced by said injected current, wherein the kit of parts comprises:
   a transmitter according to claim 10, which is connected to at least two injection electrodes configured to be inserted in the soil or loop antenna; and
   a receiver, which is configured to measure the soil electromagnetic field induced by the injected current.

* * * * *